United States Patent [19]

Resnikoff et al.

[11] Patent Number: 5,081,645
[45] Date of Patent: Jan. 14, 1992

[54] NOVEL SPREAD SPECTRUM CODEC APPARATUS AND METHOD

[75] Inventors: Howard L. Resnikoff, Winchester; David Pollen, Lexington; Wayne M. Lawton; Ramesh A. Gopinath, both of Somerville, all of Mass.

[73] Assignee: Aware, Inc., Cambridge, Mass.

[21] Appl. No.: 563,275

[22] Filed: Aug. 6, 1990

[51] Int. Cl.⁵ .................................................. H04L 27/30
[52] U.S. Cl. .................................. 375/1; 380/34; 375/68; 375/80; 375/94; 370/19
[58] Field of Search ............... 370/19, 21, 22; 375/62, 375/67, 68, 80, 82, 83, 88, 94

[56] References Cited

U.S. PATENT DOCUMENTS 4,351,064  9/1982  Ewanus .................................. 380/34
4,894,842  1/1990  Broekhoven et al. ................. 375/1

Primary Examiner—Bernarr E. Gregory
Attorney, Agent, or Firm—McCubbrey, Bartels, Meyer & Ward

[57] ABSTRACT

A system comprising apparatuses and methods for encoding and decoding spread spectrum signals is disclosed. Signals are encoded by modulating numerical sequences selected from an orthonormal basis of numerical sequences to provide channel coding. The modulated sequences are then combined to form an encoded signal. Because of the orthonormal character of the sequences, the encoded signal may be easily decoded using a matched filter. A method for generating long sequences from the product of shorter sequences is also disclosed.

14 Claims, 5 Drawing Sheets

FIGURE 5

TABLE I $\mu=3$

| $w_i(0)$ | $w_i(1)$ | $w_i(2)$ |
|---|---|---|
| 0.35184 | 0.04002 | 0.0 |
| 0.73291 | 0.08336 | 0.0 |
| 1.2251 | 0.13935 | 0.0 |
| 0.77288 | -0.12660 | 0.03099 |
| 0.34406 | -0.40773 | 0.06455 |
| -0.30698 | -0.78188 | 0.10790 |
| -0.12472 | 1.0964 | -1.0209 |
| -0.07698 | 0.67676 | 1.3050 |
| 0.08187 | -0.71977 | -0.48752 |

$\mu=4$

| $w_i(0)$ | $w_i(1)$ | $w_i(2)$ | $w_i(3)$ |
|---|---|---|---|
| 0.53957 | 0.16490 | 0.0 | 0.0 |
| 0.78957 | 0.24130 | 0.0 | 0.0 |
| 1.0395 | 0.31771 | 0.0 | 0.0 |
| 1.2895 | 0.39411 | 0.0 | 0.0 |
| 0.46042 | -1.5065 | 0.73029 | 0.81649 |
| 0.21042 | -0.68852 | -0.36514 | -1.6329 |
| -0.03957 | 0.12950 | -1.4605 | 0.81649 |
| -0.28957 | 0.94752 | 1.0954 | 0.0 |

$\mu=6$

| $w_i(0)$ | $w_i(1)$ | $w_i(2)$ | $w_i(3)$ | $w_i(4)$ | $w_i(5)$ |
|---|---|---|---|---|---|
| 0.25700 | -0.03031 | 0.0 | 0.0 | 0.0 | 0.0 |
| 0.41657 | -0.04913 | 0.0 | 0.0 | 0.0 | 0.0 |
| 0.60392 | -0.07123 | 0.0 | 0.0 | 0.0 | 0.0 |
| 0.81905 | -0.09661 | 0.0 | 0.0 | 0.0 | 0.0 |
| 1.06195 | -0.12526 | 0.0 | 0.0 | 0.0 | 0.0 |
| 1.33263 | -0.15719 | 0.0 | 0.0 | 0.0 | 0.0 |
| 0.86006 | 0.06366 | 0.03127 | 0.0 | 0.0 | 0.0 |
| 0.70759 | 0.18416 | 0.05070 | 0.0 | 0.0 | 0.0 |
| 0.49956 | 0.32906 | 0.07350 | 0.0 | 0.0 | 0.0 |
| 0.23598 | 0.49836 | 0.09968 | 0.0 | 0.0 | 0.0 |
| -0.08315 | 0.69206 | 0.12924 | 0.0 | 0.0 | 0.0 |
| -0.45785 | 0.91016 | 0.16218 | 0.0 | 0.0 | 0.0 |
| -0.11707 | -0.99250 | -1.7658 | -0.62105 | 0.62105 | -0.54772 |
| -0.12416 | -1.0526 | -0.07860 | 0.62105 | -1.0350 | 1.6431 |
| -0.10348 | -0.87735 | 0.84560 | 0.82807 | -0.62105 | -1.6431 |
| -0.05503 | -0.46654 | 1.0068 | 2.3676 | 1.8631 | 0.54772 |
| 0.02012 | 0.17976 | 0.40506 | -1.8631 | -0.82807 | 0.0 |
| 0.12521 | 1.0615 | -0.95960 | 1.0350 | 0.0 | 0.0 |

NOVEL SPREAD SPECTRUM CODEC APPARATUS AND METHOD

FIELD OF THE INVENTION

The present invention relates to communications systems and, more particularly, to systems which utilize spread spectrum techniques.

BACKGROUND OF THE INVENTION

Spread spectrum communication systems provide significant improvements in communication systems which must operate in noisy environments. Consider a simple digital communication system in which messages consisting of strings of bits are sent from a transmitter to a receiver. The transmission typically involves modulating a carrier signal with a waveform which specifies the value of the bit being sent. The output of the transmitter for a single bit will be referred to as the bit signal in the following discussion. In a binary transmission system, there are two such bit signals, one representing zero and the other representing one.

Upon reaching the receiver, the detected bit signals are compared with those corresponding to one and zero to ascertain each bit in the sequence. In a noisy environment, any bit signal may be corrupted by a noise pulse in its journey from the transmitter to the receiver. The probability of such a corruption is related to the statistical distribution of the noise pulses. In particular, it is related to the probability of finding a noise pulse which will add sufficient energy to the bit signal during transmission to corrupt that bit in a manner that will cause the receiver to mis-identify the bit signal.

It should be noted that the addition of a constant amount of energy to each bit signal would cause no corruption of the signal, as the receiver could compensate by subtracting a constant from each detected bit signal. Hence, the corruption results from adding different amounts of noise energy to different bit signals. The variation in the amount of energy added to each bit signal will depend on the duration of the bit signals. If the bit signals are long compared to the duration of the noise pulses, than the energy added to any given bit signal will be the average of the energies in a large number of noise pulses. Such an average will be relatively constant from bit signal to bit signal. If, however, the duration of the bit signals is of the same order as that of the noise pulses, the variation in added noise energy from bit signal to bit signal will be relatively large. Hence, it is advantageous to use relatively long bit signals.

If the bit signals did not to overlap in time, such a strategy would result in a very low transmission bit rate on the communication channel. Such a reduction in transmission rate is clearly to be avoided. Hence, a system in which the bit signals from adjacent bits in the message must overlap is desirable. The resultant transmission at any given time is the sum of the bit signals from a large number of bits. Such a system will be referred to as a spread spectrum communication system in the following discussion.

Consider a simple system in which the bit signal for zero consists of the sequence $G[0,i]$ for $i=0 \ldots L-1$, and the bit signal for one consists of the sequence $G[1,i]$ for $i=0 \ldots L-1$. In the following discussion, "L" is generally used for the number of elements in the bit signal. A sequence of bits $b(j)$ is to be sent. It is assumed that the transmitter and receiver are clocked at a predetermined rate and that a bit is introduced into the apparatus on each clock pulse. The transmitter includes L shift registers, each of length L. When a bit is to be transmitted, the appropriate bit signal is loaded into the next free shift register. On each clock pulse, all of the shift registers are shifted once, and the data which is shifted off of the end of each shift register is added to form the transmitted signal. The signal will then be a sequence $\sigma(k)$, where k denotes the clock pulse and $$\sigma(k) = \sum_{j=0}^{L-1} G[b(j),k-j] \quad (1)$$

In the absence of noise, the bits $b(j)$ can be recovered at the receiver by solving an $L \times L$ system of linear equations. However, the computational workload involved makes this approach impractical for long waveforms.

If, however, the bit signals are orthogonal, the matrix representing the system of linear equations is diagonal, and the bits can be recovered by computing the correlation of the signal $\sigma(k)$ with the sequences $G[1,i]$ and $G[0,i]$. If a bit having a value of B was sent at starting at time K, then the correlation function $$C_b = \sum_{i=0}^{L-1} G[b,i]S(K+L-i) \quad (2)$$

should be one for $b=B$ and 0 otherwise. It should be noted that the orthogonality requirement restricts the manner in which the message is sent. In particular, it can be shown that no finite sequence $G[b,i]$ is orthogonal to itself shifted by one. Hence, if orthogonal sequences are utilized, the data bits can, at most, be introduced into the transmitter on every other clock pulse.

Orthonormal bit signals have the additional property of being more immune to burst noise for a given length waveform. If non-orthonormal signals are used and $\sigma(k)$ is corrupted by a burst of noise at some time K, sufficient information may be lost to prevent the system of equations from being solved. If, however, orthonormal bit signals are utilized, the effect of the noise is to lower the correlation value for the correct bit value and increase the correlation for the incorrect bit value. Hence, provided the noise is not sufficient to make the correlation values corresponding to different bits indistinguishable, the signal can be recovered even in the presence of burst noise. Hence, orthonormal bit signals are preferred.

In addition to orthonormality, it is advantageous to utilize bit signals which have the property that the sum signal $\sigma(k)$ is statistically indistinguishable from the noise to within some tolerance. It can be shown that this requirement allows the system to utilize a greater fraction of the bandwidth of a noise channel for communication (C. Shannon "Communications theory of secrecy systems", Bell Systems Tech. Journal, 28 pp. 676–715, 1949).

This last property also provides a means for embedding a spread spectrum communication in the noise in a communication channel being used for other purposes. In addition to providing security for the information being transmitted, such a system may also be used to multiplex communications. For example, a spread spectrum system satisfying this condition could be used to send digital data on top of voice data in a telecommunication system. The digital data would merely appear as low level random noise. The extent to which background interference is found to be objectionable to human listeners depends greatly on the form of the interference. In particular, human listeners are less sensitive to random noise than to noise having a regular pattern. Hence, a significantly higher signal power may be used for the digital communication if the spread spectrum system is indistinguishable from the typical static encountered on telephone lines.

While the basic features for such a system have been known for some time, no practical system meeting all of the conditions has been provided in the prior art. For example, Shannon proposed using two sequences, $G_0$ and $G_1$, for the bit signals in which each sequence consists of numbers having a Gaussian random distribution. It may be shown that two random sequences are statistically orthonormal.

Unfortunately, this suggested method has a number of problems. It should be noted the it is advantageous to be able to vary the length of the bit signals in response to the noise environment. When used to provide a reduction in noise errors, there is an optimal length for the bit signals. The computational load inherent in the correlation operation for decoding the signal at the receiver is related to the length of the bit signal. Hence, shorter bit signals are preferred. On the other hand, the ability to withstand noise interference improves with the length of the bit signal. However, there is a point at which doubling the length of the bit sequence results in only a small improvement in interference rejection. If the bit signal is much longer in time than the average noise pulse, very little additional improvement is obtained by further increasing the size of the bit signal.

It is impossible to generate truly random signals of finite length. Pseudo-random sequences are known to the prior art; however, to satisfy the orthonormality conditions within a sufficient tolerance, the length of a pseudo-random sequence must be quite long. Hence, bit signals which are much longer than the optimum length must often be used if pseudo-random sequences are employed. Ideally one would like to be able to vary the length of the bit signals without altering the orthonormal character of the signals. No practical method for generating specified length sequences that appear random having this property is taught in the prior art.

In addition to the above mentioned problems, prior art systems are difficult to synchronize. Before a receiver can interpret the message sent by a transmitter, the transmitter and receiver must be synchronized. Initial synchronization is the most difficult to achieve. In long data transmissions, the receiver and transmitter must be periodically re-synchronized to correct for small differences in the frequencies of the clocks used in each device and/or drifts in the clock frequencies. In addition, changes in the distance between the transmitter and receiver can also lead to a loss of synchronization. Such changes in distance are encountered when one of the parties is utilizing mobile communications equipment such as a cellular telephone.

To achieve initial synchronization without using some form of non-spread spectrum encoding, the phase of the receiver's clock is typically varied until a synchronization message is successfully decoded. The time needed to achieve initial sychronization is related to the length of the synchronization message and to the length of the bit signals used in the spread spectrum code. Hence, short synchronization messages and codes are preferred. However, the synchronization message must be long enough to guarantee that part of a valid message is not mistaken for a synchronization signal during the periodic resynchronization procedures.

If non-spread spectrum synchronization signals are used, the power levels must be increased which can cause interference with other signals in the communication band. Such high power signals can be objectionable if the communication channel is being shared, as these signals would interfere with the other communications on the channel. In addition, in secure communication situations in which the user wish to hide the fact that a communication is taking place, such high level signals can compromise the secrecy of the communication.

Broadly, it is an object of the present invention to provide an improved spread spectrum communication system.

It is a further object of the present invention to provide a spread spectrum communication system utilizing orthonormal bit signals.

It is yet another object of the present invention to provide a spread spectrum communication system in which shorter synchronization signals than those used in prior art systems can be communicated without using non-spread spectrum codes and without being mistakenly interpreted by the receiver as part of a message.

These and other objects of the present invention will be apparent to those skilled in the art from the following detailed description of the invention and the accompanying drawings.

SUMMARY OF THE INVENTION

The present invention comprises novel encoding and decoding apparatuses for generating a spread spectrum signal and decoding said spread spectrum signal, respectively. A spread spectrum encoding apparatus according to the present invention includes circuitry for receiving an input signal comprising an ordered sequence of symbols. The encoding apparatus includes a memory for storing a first spread spectrum basis comprising one or more channel sequences, each said channel sequence comprising an array of numerical values of length L, the number of said channel sequences being less than or equal to $\mu$, wherein $\mu$ is equal to the multiplier of said first spread spectrum basis and $\mu > 1$. A clock generates a sequence of timing signals. A controller included in the invention generates a sum array comprising an ordered array of numerical values $\alpha(k)$, for $k=0$ to $(L-1)$. The controller includes means for selecting a said channel sequence and for multiplying said selected channel sequence by a numerical value depending on said received symbol. The apparatus includes means for storing a spread spectrum array comprising an ordered array of numerical values $\beta(k)$ for $k=0$ to $L-1$. The sum array is combined with the spread spectrum array by adding $\alpha(k)$ to $\beta(k+\mu q)$, where q is a positive integer, at each clock pulse. The spread spectrum array is shifted each clock pulse and $\beta(L-1)$ is outputted. Then, $\beta(k)$ is replaced by $\beta(k-1)$ for $k=1$ to $(L-1)$, and $\beta(0)$ is replaced by 0.

The decoding apparatus comprises means for receiving an input signal. In response to timing signals from a clock, an ordered sequence of numerical values is generated from said input signal. The previously generated L said numerical values are stored by the decoding apparatus. The decoding apparatus also includes a memory for storing a first spread spectrum basis comprising one or more channel sequences, each said channel sequence comprising an array of numerical values of length L, the number of said channel sequences being less than or equal to $\mu$, wherein $\mu$ is equal to the multiplier of said spread spectrum basis. Every $q\mu$ timing signals, a correlator generates a signal related to the cross-correlation of said stored L and a said channel sequence stored in said memory means. Here, q is a predetermined positive integer. A value related to said generated signal is outputted by the decoding apparatus. Said value corresponds to the decoded spread spectrum signal.

BRIEF DESCRIPTION OF THE DRAWINGS

FIG. 5 shows Table I which provides exemplary channel sequences according to the present invention.

DETAILED DESCRIPTION OF THE INVENTION

Figure 1:
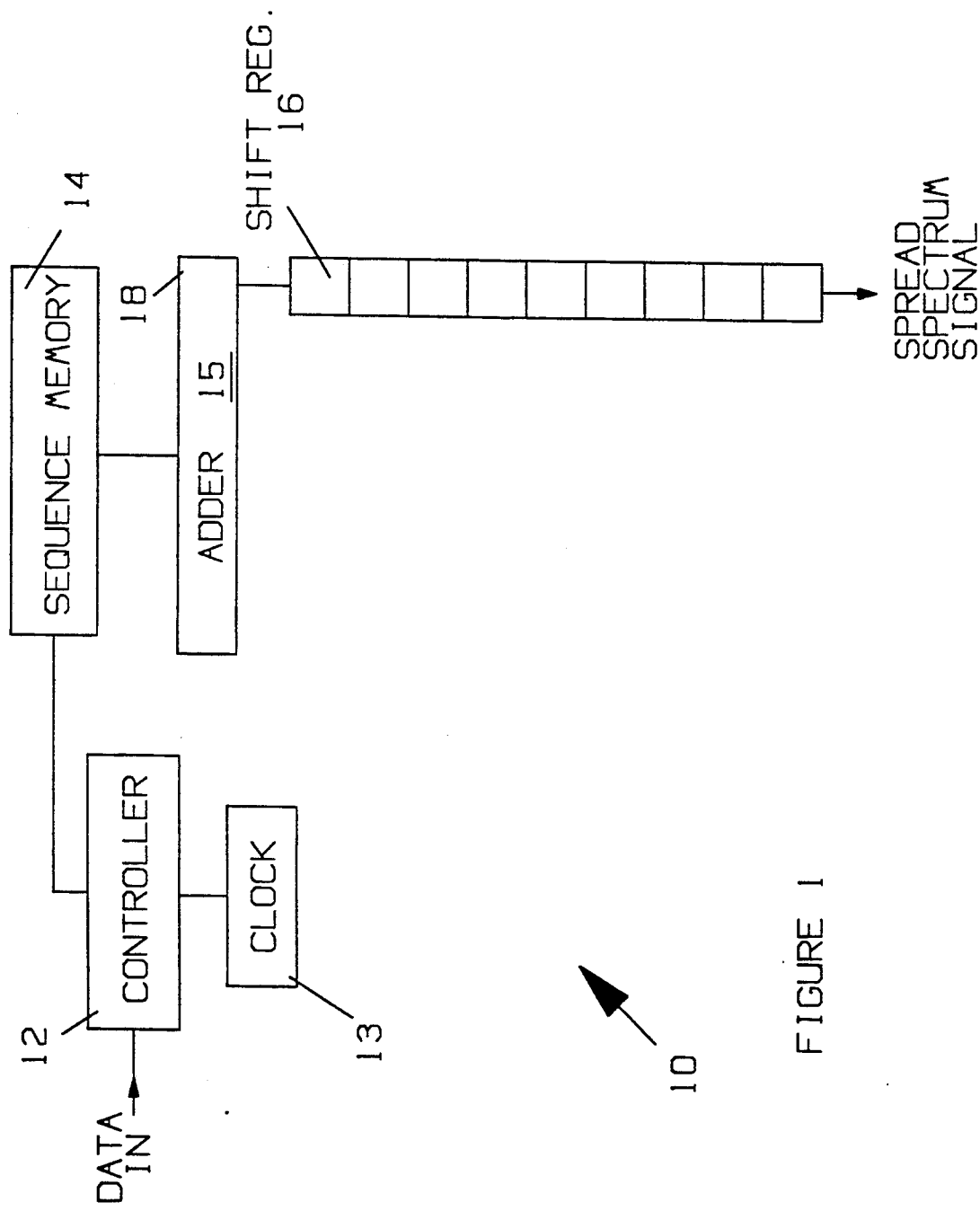
FIG. 1 is a block diagram of one embodiment of a spread spectrum signal encoder 10 according to the present invention.
Figure 2:
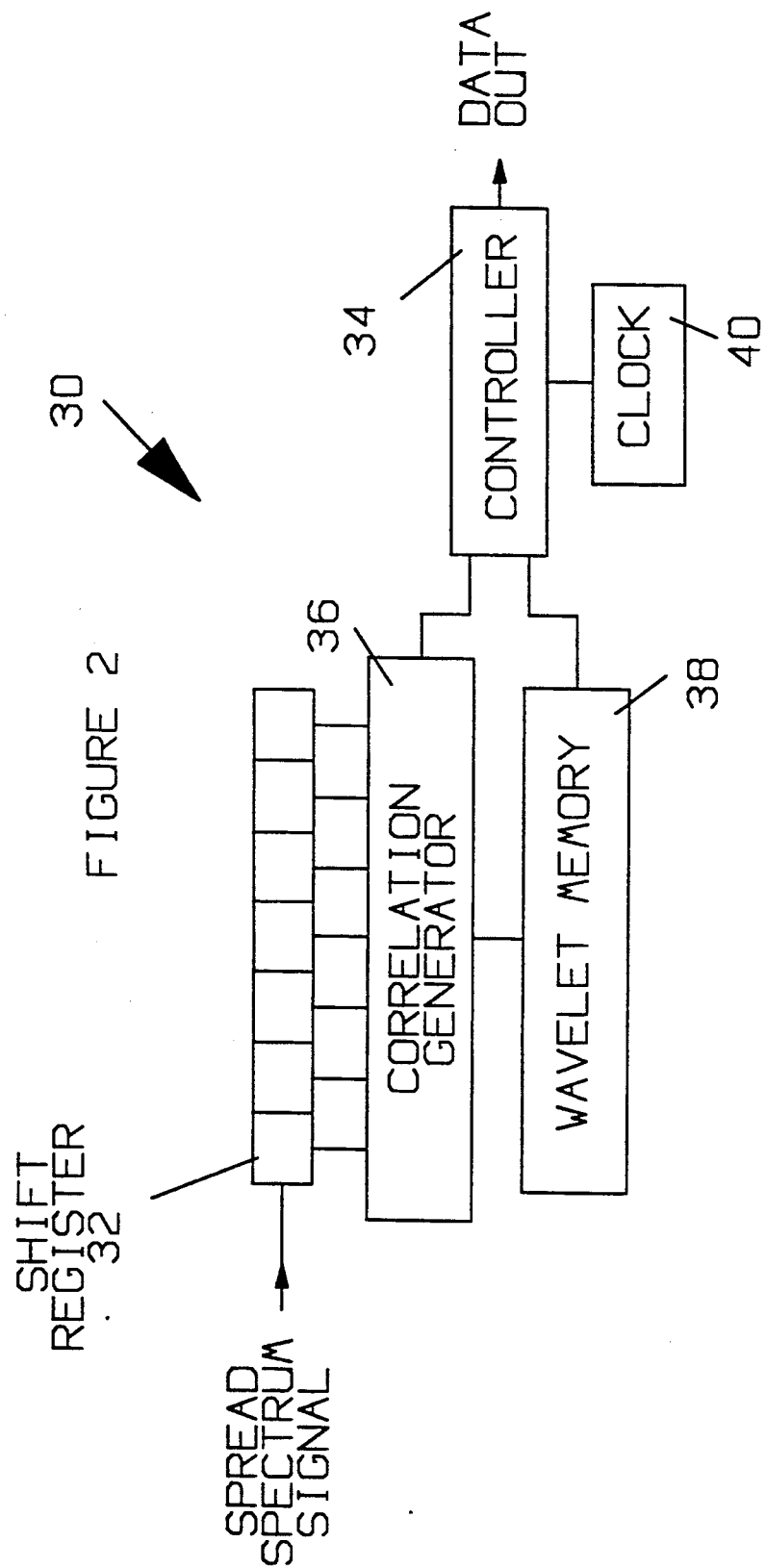
FIG. 2 is a block diagram of an exemplary spread spectrum signal decoder 30 according to the present invention.

The manner in which the present invention operates may be more easily understood with reference to FIGS. 1 and 2 which are block diagrams of one embodiment of a spread spectrum signal encoder 10 and decoder 20 according to the present invention. Spread spectrum signal encoder 10 converts a stream of binary digits into a spread spectrum signal which is typically used to modulate an analog carrier signal. To simplify the drawings, the modulation of the carrier signal has been omitted.

This embodiment of the present invention, operates by replacing each incoming bit by a bit signal sequence. The bit signal sequence is then combined with those from previously received data bits to generate a spread spectrum signal.

The operations of encoder 10 are controlled by a controller 12 which receives the input data stream. Controller 12 utilizes a clock 13 to define the various events that take place during the course of the signal encoding. In this embodiment of the present invention, one data bit is transmitted every two clock pulses. Once every two clock cycles Controller 12 selects a bit signal sequence from sequence memory 14. The bit signal sequence so selected depends on the value of the data bit to be transmitted. The selected bit signal sequence will be denoted by $w[b]_k$ where k runs from 0 to $L-1$ and b denotes the value of the bit being transmitted. Hence, sequence memory 14 must include at least two bit signal sequences.

Encoder 10 includes a shift register 16. The contents of shift register 16 will be referred to as the spread spectrum sequence in the following discussion. The values of the spread spectrum sequence will be denoted by $a(k)$, where k runs from 0 to $L-1$. The selected bit signal sequence is added by adder 15 to the contents of shift register 16 and the results stored back in shift register 16. That is, the operation $$a(k) \leftarrow a(k) + w[b]_k \qquad (3)$$

for k=0 to $L-1$ is performed once every two clock cycles.

Once every clock cycle, the contents of shift register 16 are shifted by one position. A zero is shifted into the first position and the contents of the last position are outputted as the encoded spread spectrum signal.

Provided the bit signal sequences satisfy the conditions discussed below, the encoded spread spectrum signal can be decoded by computing the cross-correlation of the spread spectrum signal with each of the bit signal sequences $w[b]_k$ for b=0 and 1.

The spread spectrum signal generated by spread spectrum signal encoder 10 may be decoded by computing the cross-correlation of the spread spectrum signal with each of the bit signal sequences. A block diagram of an exemplary spread spectrum signal decoder 30 according to the present invention is shown in FIG. 2. A spread spectrum signal is received by spread spectrum signal decoder 30 on bus 31. This signal preferably comprises a sequence of digital values such as that generated by adder 26 discussed above. Typically, the digital values result from stripping a carrier signal from an incoming analog signal and subsequent digitization of the stripped analog signal. For simplicity, the circuitry for receiving and stripping said carrier signal has been omitted from the drawing, since such circuitry is conventional in the art. The relevant parts of the digitization circuitry will be discussed in more detail below with reference to the other embodiments of a decoder according to the present invention.

As each value is received, it is shifted into shift register 32 which includes L cells. Every $\mu$ clock cycles, the cross-correlation of the L values stored in shift register 32 with each of the bit signal sequences stored in sequence memory 38 is computed. The bit signal sequences in question are the same as those used by spread spectrum signal encoder 10 discussed above. The correlation operation is carried out under the control of controller 34. Controller 34 is connected to a clock 40 which is synchronized with the clock in the spread spectrum signal encoder that generated the input spread spectrum signal. The manner in which this synchronization is maintained will be discussed in more detail below.

In the absence of noise, the cross-correlation value will be 1 for one of the $\mu$ bit signal sequences and 0 for the other bit signal sequences. In the presence of noise, the cross-correlation values will differ in absolute value from one. In this case, the bit signal sequence having the maximum cross-correlation values provides the identity of the bit transmitted by encoder 10, provide the absolute value of the cross-correlation is greater than some predetermined value.

While the embodiments described above function adequately, these embodiments may not make optimal use of the bandwidth of the communication channel over which the spread spectrum signal is being transmitted. The spread spectrum signal generated by encoder 10 comprises a sequence of digital values which vary between some minimum value $V_{min}$ and some maximum value $V_{max}$. This signal is typically sent on a communication channel by modulating a carrier of some kind. The bandwidth of that channel must be sufficient to transmit the spread spectrum signal. That is, the bandwidth must be sufficient to transmit B bits per clock pulse, where B is the number of bits needed to represent the difference between $V_{max}$ and $V_{min}$ to an accuracy sufficient to allow decoder 30 to decode the signal. In general, B will be a number significantly greater than 1.

As noted above, encoder 10 receives and encodes one bit every two clock cycles. Hence, the communication channel is being used to transmit 0.5 bits per clock pulse. However, as noted above, the communication channel is capable of transmitting B bits per clock pulse where $B >> 1$. As a result, only a small portion of the available channel bandwidth is utilized by encoder 10. The preferred embodiment of the present invention provides a more efficient utilization of the channel bandwidth.

The preferred embodiment of the present invention may be more easily understood if the communication channel is viewed as comprising $\mu$ separate channels. Once every $\mu$ clock cycles, a "symbol" is sent on each of the separate channels. For reasons to be discussed below, one of the channels is preferably reserved for calibrating the encoder-decoder system. Hence, $\mu - 1$ symbols representing the input data stream are transmitted every $\mu$ clock cycles. Each symbol has one of N possible values. For simplicity, it will be assumed that each symbol is capable of representing a fixed number of bits, i.e., $N = 2^n$. In this case, the next symbol to be sent consists of the next n bits received by the encoder. It will be apparent to those skilled in the art that embodiments in which N is not a power of two may be constructed within the teachings of the present invention. The symbols to be sent are accumulated by the encoder during the $\mu$ clock cycles between the last time the encoder encoded data and the current cycle. The order in which symbols are assigned to channels is preferably related to the order in which the data comprising a symbol was received. Hence, the first n bits would be assigned to channel 1, the next n bits to channel 2, and so on. If data specifying less than $\mu - 1$ symbols is received since the last transmission, not all of the channels are utilized.

Figure 3:
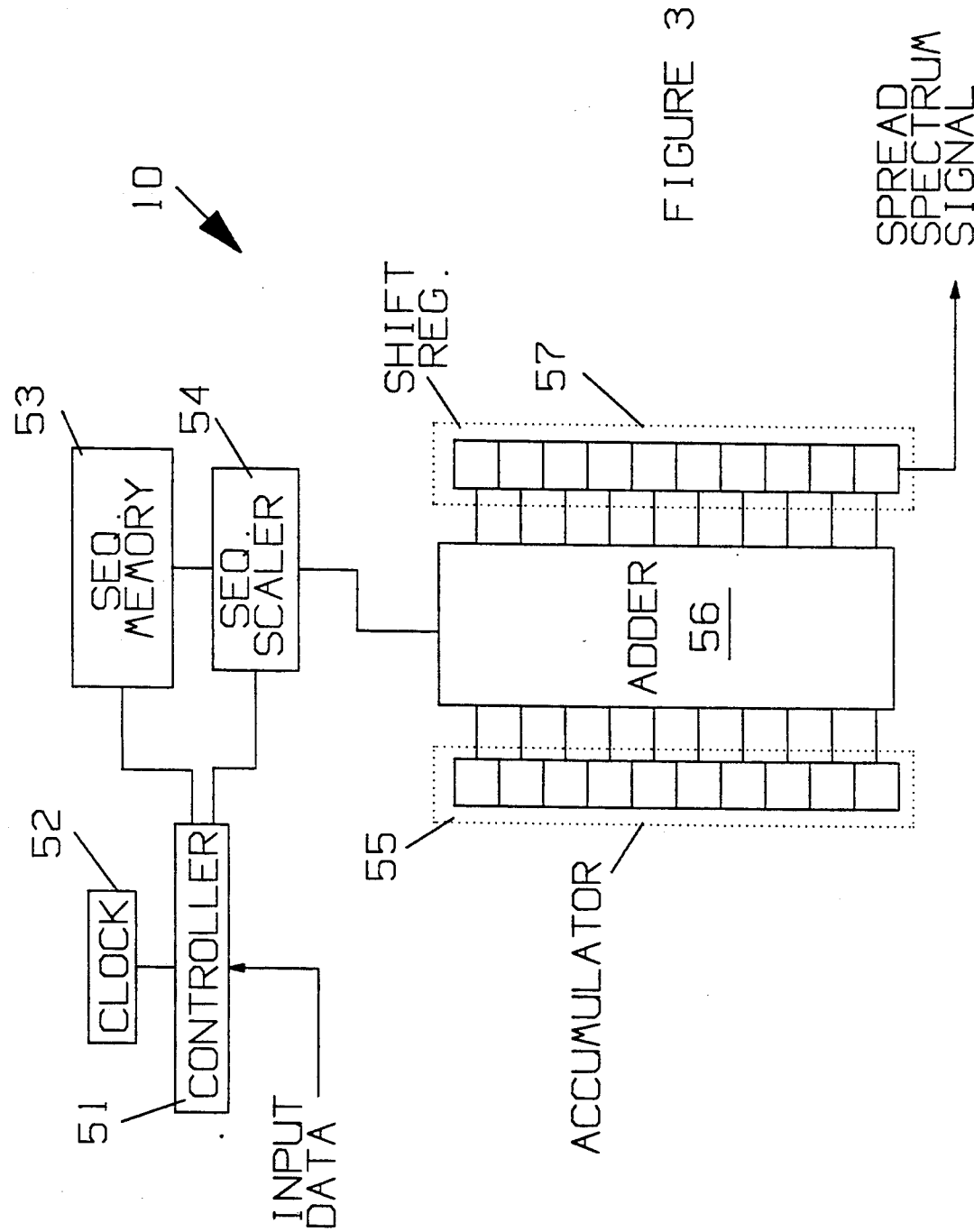
FIG. 3 is a block diagram of a second embodiment of a spread spectrum signal encoder according to the present invention.

A block diagram of an encoder 50 according to the preferred embodiment of the present invention is shown in FIG. 3. The input data is received by a controller 51 which is connected to a clock 52 which is used to synchronize the operations of encoder 50. Controller 51 converts the input data stream into a series of symbols, each symbol having one of N possible values. A symbol value comprising a numerical value between $-V$ and $+V$ is associated with each symbol. There are N descrete such values. Controller 51 also assigns a channel to each of the input symbols. The channel in question is preferably based on the order of receipt of the data specifying the symbol in question. However, embodiments in which the channel depends on the value of the symbol are also possible as will be discussed in more detail below.

A set of sequences of numbers analogous to the above described bit signal sequences is stored by encoder 50 in a sequence memory 53. One such sequence is stored for each channel. In the following discussion, these sequences will be referred to as the channel sequences. The channel sequences will be denoted by $w_p[m]$ where p runs from 0 to $L-1$, and m runs from 0 to $\mu - 1$. A set of channel sequences satisfying $$\Sigma_p w_p(i) *_{p+\mu q}(j) = E\delta_{i,j}\delta_{q,0} \quad (4)$$

where (*) denotes complex conjugation, E is a constant and the sum is performed over all values of p for which $w_p(i)$ and $w_{p+\mu q}(j)$ are non-zero will be referred to as a spread spectrum basis. Equation (4) is written in the general form for channel sequences that comprise complex numbers. If less than $\mu$ channel sequences are present in the basis, the basis will be referred to as a partial basis. Here, q is any integer, and $\delta_{x,y}$ is the delta function which is equal to 1 if $x = y$ and 0 otherwise. For notational convenience, $w_p(i)$ is defined to be 0 for $p < 0$ or $p > (L-1)$.

Controller 51 utilizing a scaling circuit 54 to multiply each channel sequence by the symbol value associated with the symbol assigned to that channel to generate a scaled channel sequence. Corresponding elements of the scaled channel sequences are then added together to form a sum sequence, $\beta(k)$, for $k = 0$ to $L - 1$. That is $$\beta(k) = \Sigma_p S_p W_k(p) \quad (5)$$

where p runs from 0 to $\mu - 1$, $S_p$ being the symbol value corresponding to the symbol assigned to channel p. The sum signal is preferably stored in an accumulator 55 comprising an L cell register. It should be noted that the contents of accumulator 55 may be generated over the $\mu$ clock cycle period between transmissions. Hence, as each set of bits specifying a symbol is received by controller 51, the channel and symbol value for that data is assigned and the scaled channel sequence generated. The scaled channel sequence is then added to the contents of accumulator 55.

At the end of each $\mu$ clock cycle period, the contents of accumulator 55 are combined with the contents of a shift register 57 utilizing adder 56. Adder 56 adds corresponding cells in each registers and places the results in the corresponding cell of shift register 57. For notational convenience, the contents of the $i^{th}$ cell of shift register 57 will be denoted by $a(i)$. Hence adder 56 performs the replacement $$a(k) \leftarrow a(k) + \beta(k) \quad (6)$$

for $k = 0$ to $L - 1$.

Shift register 57 provides an analogous function to that of shift register 16 described above. Once every clock cycle, the contents of shift register 57 are shifted by one position. A zero is shifted into the first position and the value of stored in the last position is outputted as an element of the encoded spread spectrum signal.

The spread spectrum signal generated by spread spectrum signal encoder 50 may also be decoded by computing the cross-correlation of the spread spectrum signal with each of the channel sequences in a manner analogous to that described above with reference to decoder 30. After stripping any carrier and digitizing, the spread spectrum signal is again shifted into an L-cell shift register. Once every $\mu$ clock cycles, the cross-correlation of the contents of the shift register and each of the channel sequences is computed. In the absence of noise, the cross-correlation value will be proportional to the symbol value used to modulate the channel sequence in question. The constant of proportionality is the same for all channels and represents the various gains and losses in the transmission of the signal between the encoder and decoder. If this constant of proportionality were known, the identity of the symbol being sent could be determined.

The constant of proportionality can be determined by only sending message symbols in $(\mu - 1)$ of the channels. The remaining channel is used to send a predetermined symbol. This channel will be referred to as the calibration channel in the following discussion. The symbol sent in this channel will be referred to as the calibration symbol. Since the symbol in this channel is always known, the constant of proportionality may be determined.

As noted above, when noise in present, the absolute value of the cross-correlation values will be less than the absolute value of the symbol signal. The degree to which the cross-correlation values are altered limits the number of possible symbol values that can be sent. When the cross-correlation value is altered by an amount equal to half the difference between adjacent symbol signal values, an error will occur.

The severity of this error will depend on the type of data being transmitted in the channel. If the data being transmitted were computer data, any error might be unacceptable. In this case the number of possible symbols values would be chosen to be small enough to guarantee that the minimum difference in symbol signal values is greater than the change in the cross-correlation values resulting from noise.

If, on the other hand, the data being transmitted can incur some errors, a greater number of symbol values may be utilized thereby increasing the capacity of the communication path. For example, consider the case in which each symbol represents the amplitude of an analog signal at a particular time. If the symbol signal values are chosen such that a small error in signal value results in the assignment of an amplitude which differs by only a small amount from the correct value, a non-zero error rate may be acceptable. Such digitized versions of analog transmissions are common in the telecommunications arts.

It should also be noted that the number of possible symbol values may be varied in response to the level of noise on the communication path. Digital data commonly includes check sums, parity bits, and other means for detecting errors. Consider a transmission system in which the receiver tests for errors in the incoming data. If the detected error rate is too high, the receiver signals the transmitter. The transmitter than switches to a symbol library having half the number of possible symbol values, and hence, twice the spacing between symbol signal values. This new library will result in lower error rates; however, the amount of data transmitted per unit time will be reduced by a factor of two. When the noise subsides, the receiver will note a very low error rate. The receiver can then signal the transmitter to switch back to the symbol library having more symbol values.

Thus the present invention provides a means for dynamically adapting a spread spectrum communication in a manner that more fully utilizes the channel capacity for a predetermined noise error rate.

It should also be noted, that the noise errors may also be reduced by switching to a different spread spectrum basis having channel sequences with increased lengths. In the preferred embodiment of the present invention, the sequence memories are used to store a plurality of spread spectrum bases of different lengths. When increased noise is detected, the decoder signals the encoder to switch to a basis having an increased length. In general, this will also result in a decrease in the data throughput even if a basis having the same value of $\mu$ is utilized. Increasing the length of the basis results in larger maximum and minimum values for the spread spectrum signal since a larger number of scaled channel sequence values contributes to each value in the spread spectrum signal. However, as pointed out above, the difference in these values that can be accommodated is determined by the bandwidth of the communication channel. Hence, unless the bandwidth of the communication channel can be increased, this difference in values may not be increased. The simplest method for limiting this difference, is to reduce the scaling factors, i.e., the symbol values, used to scale the channel sequences when the length of the basis is increased. However, if this is done, the number of possible symbol values must also be reduced. Hence, the throughout of the system will be decreased.

The embodiments of the present invention shown in FIGS. 1 and 3 are examples of two different methods for assigning the "channel" to an incoming data symbol. In the embodiment shown in FIG. 1, the incoming data is broken into symbols having only two possible values, zero or one. The channel on which a particular symbol was transmitted was determined by the value of the symbol. In contrast, the embodiment shown in FIG. 3 selected the channel by the order of receipt of the data comprising the various symbol values.

Additional security can be provided to the embodiment shown in FIG. 3 by assigning the channel based both on the value of symbol and its order of receipt. In this case, an unauthorized listener would need to know both the channel sequences in use and the current rule for assigning a channel to a symbol. Without this later information, the decoded message would be scrambled in the time domain.

As noted above, the spread spectrum signal decoder must be synchronized with the spread spectrum signal encoder. The time delay between the generation of a spread spectrum signal by an encoder and the reception of that signal by a decoder is, in general, not known. In practice, the spread spectrum signal generated by the encoder is used to modulate an analog carrier signal. The analog carrier signal is transmitted to the a receiver which strips the carrier signal, thereby generating a spread spectrum analog signal. The spread spectrum analog signal is then digitized using some form of A/D circuit to form a numerical sequence which is utilized by a decoder to decode the spread spectrum transmission. Since the various circuit delays and transmission delays are not known, some means for establishing synchronization must be provided.

Two levels of synchronization are needed. First, the A/D circuit mentioned above must be synchronized with the clock in the encoder to guarantee that the numerical sequence values generated by the A/D converts represent the values generated by the encoder. If the digitization is improperly timed, the resulting numerical sequence will bear little resemblance to the spread spectrum signal generated by the encoder.

Second, the decoder must determine when each $\mu$ clock cycle time period begins. The cross-correlation operation will not yield the correct values unless the portion of the spread spectrum signal that includes all of the values for a particular sum signal is correctly aligned in the shift register of the decoder. There are $\mu$ possible alignments.

The initial synchronization is provided by sending a synchronization signal from the spread spectrum signal encoder to the spread spectrum signal decoder at the start of the message. The simplest form of synchronization signal would be one having a level sufficiently above the ambient background to be easily detected by the spread spectrum signal decoder. Unfortunately, such a large amplitude signal would be objectionable in many cases. For example, if the spread spectrum communication system were being utilized to multiplex two communication systems in the same band, the synchronization signal might interfere with the second communication system. If the spread spectrum communication system were being utilized to hide a communication for security purposes, the synchronization signal could be utilized by an eavesdropper to detect the presence of the hidden communication. Hence, a high amplitude synchronization signal is not preferred.

A second prior art method of synchronizing a receiver and transmitter is to send a synchronization message. The message consists of a predetermined bit sequence which repeated until the spread spectrum signal decoder signals the spread spectrum signal encoder that it is acquired synchrony. Since the bits are sent by the spread spectrum signal encoder in a manner identical to any other message, the problems described above are avoided. Unfortunately, such a synchronization message may be difficult to detect. To detect the message, the spread spectrum signal decoder must search all possible clock phases within a $\mu$ clock cycle window until it finds a phase at which the synchronization message is decoded.

It should also be noted that even if the synchronization message is received and the spread spectrum signal decoder and spread spectrum signal encoder initially synchronized, the spread spectrum signal decoder must periodically resynchronize itself to the spread spectrum signal encoder. It is economically impractical to produce two clocks, one in the spread spectrum signal decoder and one in the spread spectrum signal encoder, that operate at a frequencies which are sufficiently close for the devices to remain in synchrony throughout a long message. Furthermore, there may be many spread spectrum signal decoder and spread spectrum signal encoder pairs in a communication system which further increases the cost by requiring that all of the devices have identical clocks. Hence, systems having less accurate clocks which are periodically resynchronized is preferred. Finally, as noted above, the time delay between transmission of the signal at the decoder and reception at the decoder may change as the result of a change in distance between the encoder and decoder.

The periodic resynchronization may be accomplished by sending a periodic resynchronization message or by waiting until synchronization is lost and repeating the initial synchronization process. The later condition can be detected by observing a high error rate in the message being sent. Such errors are routinely detected by including check sums in the digital data. This method, however, is not preferred because it interrupts the communication channel during the time need to resynchronize and introduces a significant degree of complexity into the spread spectrum signal decoder circuitry.

If a periodic synchronization message is used it must be of a form that will not be confused with the informational messages being sent on the communication channel. Hence, it must in general be a long message. In addition, circuitry must be introduced at the spread spectrum signal encoder to be sure that no such illegal data message is generated by mistake.

The present invention provides a means for avoiding the above described synchronization problems. In any message sent using the preferred embodiment of the present invention, there is one channel which is reserved for the symbol used to compute the constant of proportionality described above. Since the calibration symbol is known, the value obtained by computing the cross-correlation in this channel is indicative of the state of synchronization. Hence, a synchronization signal is always available in the present invention independent of the data being transmitted.

Initial synchronization may be established by shifting the clock phase in a $\mu$ clock cycle time window and computing the cross-correlation value in the calibration channel. The correct clock phase is the phase which maximizes the cross-correlation value. In the presence of noise, the maximum value for any given transmission may occur at a clock phase which is off the correct phase. Hence, in the preferred embodiment of the present invention, several values for the cross-correlation in question are averaged. Each such value is measured at the same clock phase but separated by $\mu$ clock cycles from the previous clock phase.

This technique may also be used to periodically resynchronize the transmitter and receiver during the transmission of a message. An exemplary spread spectrum signal decoder having circuitry for detecting and correcting for drift in synchronization is shown in FIG. 3 at 50. The analog spread spectrum signal is received on signal bus 52. This signal is typically generated by stripping a carrier signal from a high frequency carrier that was modulated by the digital spread spectrum signal generated by an embodiment of an encoder according to the present invention. The analog spread spectrum signal is digitized by A/D converters prior to being shifted into each of three shift registers 54, 56, and 58. The corresponding delay circuits are shown at 53, 55, and 57, respectively. The A/D circuits corresponding to these delay circuits are shown at 73, 75, and 77 respectively. The delays are chosen such that delay 55 is slightly larger than delay 57, and delay 57 is slightly larger than delay 56. The shifting operations are synchronized to clock 66 whose phase is under the control of controller 64.

In the absence of a shift in synchronization, shift register 56 contains the correct spread spectrum signal values. Suppose the synchronization between the spread spectrum signal decoder and spread spectrum signal decoder 50 shifts such that the spread spectrum signal arrives at spread spectrum signal encoder too early. In this case, shift register 54 will have more accurate values. Similarly, if the synchronization between the spread spectrum signal decoder 50 and spread spectrum signal encoder shifts such that the spread spectrum signal arrives at spread spectrum signal encoder too late than shift register 52 will contain the more accurate values.

The cross-correlation of the contents of each of the shift registers with each channel sequences in sequence memory 62 is generated once every $\mu$ clock cycles. A calibration signal equal to the sum of the absolute values of the cross-correlation values for each of the channel sequences may be computed for each shift register. In the absence of noise, this calibration signal will have its highest value for the shift register having the most accurate values. Hence, synchronization drift will result in one of the shift registers other than shift register 56 having the maximum sum value. The identify of the shift register indicates the direction of the shift. A correction to the clock phase is made by controller 64 when such a shift is detected.

In the presence of noise, the foregoing discussion will be correct on average. However, individual cross-correlation measurements may result in shift register 54 or 56 having the maximal sum cross-correlation measurement even when the synchronization is correct. To avoid making an erroneous clock phase correction, controller 64 preferably averages the results of several cross-correlation measurements before making a clock correction.

Having provided the above description of the preferred embodiments of a spread spectrum signal decoder and spread spectrum signal encoder according to the present invention, a more formal definition of the present invention will now be given. Following this description, the manner in which the channel sequences are calculated will be explained in detail.

A specific channel sequence W(k) is associated with each channel. Each channel sequence W(k) consists of a finite sequence of numbers; thus, each sequence is represented by a finite dimensional vector. The finite sequence of numbers that are the coordinates of the vector may be assumed to be real. A sequence representing sequences of complex numbers can be transmitted as ordered pairs of real numbers, each pair corresponding to the real and imaginary parts of the complex number in question. Thus, the $k^{th}$ channel sequence, W(k), has the form $$W(k) = (w_0(k), \ldots, w_{L-1}(k)), \tag{7}$$

where the vector components $w_j(k)$ are real numbers. The number of components, L, of the wave form is the dimension of the waveform vector W(k). As noted above, there are $\mu$ such waveforms. That is, k runs from 0 to $\mu - 1$. The set of $\mu$ waveforms will be referred to as the basis of the spread spectrum communication system. The manner in which a basis is calculated will now be discussed in more detail.

At any given time, the shift register in the decoder has the L previous sent values of the spread spectrum signal. These values are the sum of several sum signals, each sum signal being shifted by $\mu$ elements relative to the adjacent sum signal. When the last entry in the shift register corresponds to the last element of a sum signal, the encoder performs the cross-correlation calculations. Denote the clock pulse at which this sum signal was placed into the shift register in the encoder by $n_k$. This situation will exist every $\mu$ clock cycles. The basis is chosen such that the cross-correlation value obtained by using the $k^{th}$ channel sequence is proportional to the symbol signal value for the $k^{th}$ symbol sent at clock pulse $n_k$. For this condition to be satisfied, the channel sequences must satisfy Eq. (4) discussed above. If Eq. (4) is satisfied, then the cross-correlation of the spread spectrum signal with channel sequence W(i) will yield the symbol value used to multiply W(i) provided the normalization constant E is known. As noted above, the normalization constant can be determined either by using one channel to send a predetermined symbol value. Alternatively, in the case in which only two symbol values are possible, the sign of the cross-correlation value is sufficient to determine the symbol value.

In secure communication settings, it would be advantageous to require the channel sequences to satisfy one additional constraint, namely $$\Sigma_p W_p(i) = 0 \tag{8}$$

This constraint guarantees that the spread spectrum signal has a DC average of zero over a time frame of L clock cycles. In the absence of such a constraint, the average value of the DC component of the spread spectrum signal will be approximately zero over L clock cycles. This later result assumes that the symbol values are uniformly spread between $-N$ and N, where N is some number.

Numerical values satisfying Eq. (4) for a given value of $\mu$ may be calculated by convention numerical procedures on a digital computer. Some examples of bases are given in Table I for some relatively small values of L.

In general, the solutions of Eq. (4) are irrational numbers. For example, a four component solution of this equation for $\mu = 2$ is as follows:

$$W(0) = [(1 + \sqrt{3})/4, (3 + \sqrt{3})/4, (3 - \sqrt{3})/4, (1 - \sqrt{3})/4] \tag{9}$$

$$W(1) = [(1/\sqrt{3})/4, -(3 - \sqrt{3})/4, (3 + \sqrt{3})/4, -(1 + \sqrt{3})/4] \tag{10}$$

If the waveform values are coded directly as real numbers, it will not, in general, be possible to exactly represent the waveform values in a computer. The numerical round-off error may have adverse cumulative effects when large numbers of long waveforms are overlapped in a typical background environment of a noisy channel. In principle, a detailed analysis can be conducted which provides restrictions on waveform length and numerical round-off error to insure accurate reception and decoding of the waveform by the receiver matched filter.

The present invention provides a means for avoiding these round-off error problems. In the preferred embodiment of the present invention, the channel sequences consist of numbers whose values are all dyadic rational numbers with a fixed denominator. A number is said to be dyadic rational if it can be written in the form $m/2^n$ where m is an integer and n is a non-negative integer. If the sequence values are all dyadic rational numbers, then the values can be exactly represented on a digital computer.

For example, consider the $\mu = 2$ channel sequences $$W(0) = (\tfrac{1}{2}, \tfrac{1}{2}, 1, 0, -\tfrac{1}{2}, \tfrac{1}{2}) \tag{11}$$

$$W(1) = (\tfrac{1}{2}, \tfrac{1}{2}, 0, -1, \tfrac{1}{2}, -\tfrac{1}{2}) \tag{12}$$

It can be shown that these sequences satisfy Eq. (4) and in addition can be represented exactly by only 2 bits per component.

The above examples have utilized relatively short digital waveforms. These can be derived by conventional techniques for solving Eq. (4) together with any other requirements such as the length L and the constraint that the components be dyadic rational numbers. Unfortunately, the numerical solution of the equations is time consuming if L is large.

In addition, there are situations in which it would be advantageous to rapidly switch between different bases of long digital waveforms during the communication. Such "hopping" between bases provides a means for further increasing the security of the communication path. The computational work-load to generate a new set of digital waveforms in real time is too high for such hoping to be practical unless all possible sets have been stored in advance in both the transmitter and receiver. However, such pre-storage requires a substantial amount of storage space.

In addition, pre-storage can compromise system security. In secure communication systems, the waveforms comprise codes for encoding communications. The success of such a coding scheme depends on keeping the codes secret, thereby forcing an unauthorized person to search all possible codes in order to decode the message. The difficulty of searching all possible codes is significantly reduced if the searcher knows in advance that the codes must be contained in some predetermined list which has significantly fewer entries than the list of all possible codes. If the codes are pre-stored, an unauthorized person can gain access to the "reduced list" by examining a transmitter or receiver.

In the preferred embodiment of the present invention, long sequences are computed from smaller sequences. It can be shown that any long sequences can be written as a product of factor sequences. The minimal length sequences are referred to as "prime" sequences. Further, if the components of all of the factor sequences belong to a mathematical ring, then the components of the product sequences belong to the same ring. In particular, the product of sequences whose components are dyadic rational numbers is a sequence whose components are dyadic rational numbers. Hence, long dyadic sequences can be derived from short dyadic sequences.

The manner in which long waveforms are constructed from smaller waveforms will now be described in detail. Consider a case in which two bases $\{a[i]_k\}$ and $\{b[i]_k\}$ having lengths $L_a$ and $L_b$, respectively, are known. Each basis has multiplier $\mu$. The following method provides a means for calculating a third basis $\{c[i]_k\}$ of length $L_c$ and multiplier $\mu$, where $L_c$ is greater than the maximum of $L_a$ and $L_b$ provided $\{a[i]_k\}$ and $\{b[i]_k\}$ satisfy certain conditions. A basis $\{c[i]_k\}$ obtained by this method will be referred to as a Pollen product basis, and the process of obtaining the product basis from the component bases will be referred to as the calculation of the Pollen product of two bases.

Broadly, the basis $\{c[i]_k\}$ is computed by defining a first matrix that depends on the basis $\{a[i]_k\}$ and a second matrix that depends on basis $\{b[i]_k\}$. These two matrices are then multiplied using the conventional rules for multiplying matrices. The elements of the matrix resulting from the multiplication provide the elements of the basis $\{c[i]_k\}$. Each of the matrices in question is a $\mu \times \mu$ matrix.

The elements of each of the matrices mentioned above are polynomials. Given any basis $\{d[i]_k\}$, define the matrix $U[d]$ to be the matrix whose elements are $$U[d]_{mn} = (1/\sqrt{\mu}) \Sigma_k d[n]_{\mu k + m} Z^{\mu k} \tag{12}$$

where m and n run from 0 to $\mu - 1$. Each element of U is a polynomial in the variable Z.

Having made the above definitions, the manner in which a basis $\{c[i]_k\}$ is calculated from two known bases, $\{a[i]_k\}$ and $\{b[i]_k\}$ will now be discussed. The procedure has three steps. First, construct the matrices $U[a]$ and $U[b]$. Second, multiply $U[a]$ and $U[b]$ to obtain a matrix $U[c]$. Third, write the elements of the resultant matrix in the form shown in Eq. (12) with $d=c$. The values of the coefficients $c[i]_k$ will then have been expressed as functions of $a[i]_k$ and $b[i]_k$, thereby allowing $c[i]_k$ to be calculated.

The length, $L_c$, of the channel sequences in $\{c[i]_k\}$ will depend on $L_a$ and $L_b$. The exact relationship depends on the values of $L_a$ and $L_b$. In general, $L_c$ will be larger than the maximum of $L_a$ and $L_b$. However, there are cases in which $L_c$ is equal to the maximum of $L_a$ and $L_b$. If such a case is encountered, a different choice of basis must be used for either $\{a[i]_k\}$ or $\{b[i]_k\}$.

It should be noted that the first value of k for which $c[i]_k$ is non-zero may differ from the value of k for which first value of $a[i]_k$ or $c[i]_k$ is non-zero. Hence, it may be desirable to renumber the elements of $\{c[i]_k\}$.

It should be noted that the matrix obtained by the product $U[a]U[b]$ is different from that obtained from $U[b]U[a]$. Hence, two Pollen product bases can be defined from $\{a[i]_k\}$ and $\{b[i]_k\}$.

It should also be noted that if the values $a[i]_k$ and $b[i]_k$ are all dyadic rational numbers, than a $\{c[i]_k\}$ consisting entirely of dyadic rational numbers may be constructed in a manner similar to that described above. In particular, $\{c[i]_k\}$ is contructed by first performing the three matrix product $U[a]IU[b]$, where $$I_{r,s} = (1/\sqrt{\mu}) e^{2\pi i/\mu}$$

Here, 'i' is the $\sqrt{(-1)}$.

It has been found experimentally that long Pollen product generated sequences have statistical distributions similar to the random noise typically encountered in communication systems. Hence, the present invention provides a means for approximating the statistical background of many communication environments.

The above embodiments of the present invention have assumed that the sequence memories store all of the sequences for a basis. It will be apparent to those skilled in the art, that embodiments of the present invention that utilize less than all of the available sequences in a basis are possible. Such embodiments would only need to store a partial basis in the sequence memories. Such embodiments of the present invention are equivalent to the ones discussed above with only a portion of the channels being utilized.

While the above embodiments used the various channels to send different portions of the same input data stream, it will be apparent to those skilled in the art that different channels can be used to send different data streams. Such an embodiment of the present invention would provide a means for multiplexing a plurality of communications on a single communication path while providing the benefits of spread spectrum transmission.

While the above embodiments of an encoder according to the present invention construct a spread spectrum signal by combining the sum signal with the spread spectrum sequence stored in the shift register every $\mu$ clock cycles, it will be apparent to those skilled in the art that this combining operation will yield a valid spread spectrum signal if it is carrier out at any integer multiple of $\mu$ clock cycles There has been described herein a novel apparatus and method for coding and decoding an image. Various modifications to the present invention will become apparent to those skilled in the art from the foregoing description and accompanying drawings. Accordingly, the present invention is to be limited solely by the scope of the following claims.

What is claimed is:

1. A spread spectrum encoding apparatus for generating a code sequence comprising an ordered sequence of values from an ordered sequence of symbols, said encoding apparatus comprising:

means for receiving an input signal comprising predetermined number of symbols from said ordered sequence of symbols;

memory means for storing at least a portion of a first spread spectrum basis having a multiplier $\mu$ comprising one or more channel sequences, the $m^{th}$ said channel sequence comprising an array of numerical values $w_p$, where p runs from 0 to L−1, wherein each said channel sequence being of length L, the number of said stored channel sequences being less than or equal to $\mu$, wherein $$\sum_p w_p(i) w^*_{p+\mu q}(j) = E\delta_{i,j}\delta_{q,0}$$

where (*) denotes complex conjugation, E is a constant, $\mu$ is a positive integer, and the sum is performed over all values of p for which $w_p(i)$ and $w_{p+\mu q}(j)$ are non-zero;

clock means for generating a sequence of timing signals;

control means connected to said memory means and said receiving means for generating a sum array comprising an ordered array of numerical values $\beta(k)$, for k=0 to (L−1), said control means comprising means for selecting a said channel sequence corresponding to each of said predetermined number of symbols, for multiplying said selected channel sequence by a numerical value depending on said corresponding received symbol, and for adding corresponding values of said multiplied channel sequences to form said ordered array $\beta(k)$;

means for storing a spread spectrum array comprising an ordered array of numerical values $\alpha(k)$ for k=0 to L−1;

means connected to control means and said spread spectrum array storing means for combining said sum array with said spread spectrum array comprising means for adding $\beta(k)$ to $\alpha(k)$, said combining means being responsive to said clock means having generated $\mu q$ said timing signals, where q is a positive integer; and shifting means for outputting $\alpha(L-1)$ as the next value in said generated code sequence, for replacing $\alpha(k)$ by $\alpha(k-1)$ for k=1 to (L−1), and for replacing $\alpha(0)$ by 0, said shifting means being connected to said spread spectrum array storing means and being responsive to said clock means having generated a said timing signal.

2. The spread spectrum encoding apparatus of claim 1 wherein said channel sequence selected by said control means depends on the order of receipt of said received symbol.

3. The spread spectrum encoding apparatus of claim 1 wherein said means for multiplying said selected channel sequence by a numerical value in said control means comprises means for multiplying said channel sequence by a numerical value depending on a said received symbol.

4. The spread spectrum encoding apparatus of claim 1 wherein said memory means further comprises means for storing a second spread spectrum basis having a multiplier of $\mu$, and wherein said control means further comprises means for generating a third spread spectrum basis comprising the Pollen product of said first and second spread spectrum bases.

5. The spread spectrum encoding apparatus of claim 1 wherein said numerical values comprising said first spread spectrum basis are dyadic rational numbers.

6. A spread spectrum decoding apparatus for decoding a spread spectrum encoded input signal to generate a decoded signal, said apparatus comprising:

means for receiving said input signal;

clock means for generating a sequence of timing signals;

means connected to said receiving means and said clock means for generating an ordered sequence of numerical values from said input signal and for storing the previously generated L said numerical values, said generating means being responsive to said timing signals;

memory means for storing at least a portion of a first spread spectrum basis having a multiplier $\mu$ comprising one or more channel sequences, the $m^{th}$ said channel sequence comprising an array of numerical values $w_p$ where p runs from 0 to L−1, wherein each said channel sequence is of length L, the number of said stored channel sequences being less than or equal to $\mu$, wherein $$\sum_p w_p(i) w^*_{p+\mu q}(j) = E\delta_{i,j}\delta_{q,0}$$

where (*) denotes complex conjugation, E is a constant, $\mu$ is a positive integer, and the sum is performed over all values of p for which $w_p(i)$ and $w_{p+\mu q}(j)$ are non-zero;

correlation means connected to said memory means and said generating means for generating a signal related to the cross-correlation of said previously generated L said numerical values and a said channel sequence stored in said memory means, said correlation means being responsive to said clock means having generated $q\mu$ said timing signals wherein q is a predetermined positive integer; and means connected to said correlation means for outputting a value representing said decoded signal, said value being related to said generated signal generated by said correlation means.

7. The spread spectrum decoding apparatus of claim 6 wherein said memory means further comprises means for storing a second spread spectrum basis having a multiplier of $\mu$, and wherein said spread spectrum decoding means further comprises control means for generating a third spread spectrum basis comprising the Pollen product of first and second spread spectrum bases.

8. The spread spectrum decoding apparatus of claim 6 wherein said numerical values comprising said first spread spectrum basis are dyadic rational numbers.

9. The spread spectrum decoding apparatus of claim 6 further comprising delay means for between said receiving means and said generating means for introducing a variable delay between the receipt of said input signal and the generation of said ordered sequence of numerical values.

10. A method for encoding a spread spectrum signal comprising the steps:

receiving an input signal comprising an ordered sequence of symbols;

storing at least a portion of a first spread spectrum basis having a multiplier $\mu$ comprising one or more channel sequences, the $m^{th}$ said channel sequence comprising an array of numerical values $w_p$ where p runs from 0 to L−1, wherein each said channel sequence is of length L, the number of said stored channel sequences being less than or equal to $\mu$, wherein $$\sum_p w_p(i) w^*_{p+\mu q}(j) = E \delta_{i,j} \delta_{q,0}$$

where (*) denotes complex conjugation, E is a constant, $\mu$ is a positive integer, and the sum is performed over all values of p for which $w_p(i)$ and $w_{p+\mu q}(j)$ are non-zero;

generating a sequence of timing signals;

generating a sum array comprising an ordered array of numerical values $\beta(k)$, for k=0 to (L−1), said control means comprising means for selecting a said channel sequence corresponding to each of said predetermined number of symbols, for multiplying said selected channel sequence by a numerical value depending on said corresponding received symbol, and for adding corresponding values of said multiplied channel sequences to form said ordered array $\beta(k)$;

storing a spread spectrum array comprising an ordered array of numerical values $\alpha(k)$ for k=0 to L−1;

combining said sum array with said spread spectrum array comprising means for adding $\beta(k)$ to $\alpha(k)$, said combining means being responsive to said clock means having generated $\mu q$ said timing signals, where q is a positive integer; and at each timing signal, outputting $\alpha(L-1)$ as the next value in said generated code sequence, for replacing $\alpha(k)$ by $\alpha(k-1)$ for k=1 to (L−1), and for replacing $\alpha(0)$ by 0.

11. The method of claim 10 wherein said selected channel depends on the order of receipt of said received symbol.

12. The method of claim 10 wherein said the step of multiplying said selected channel sequence by a numerical value comprises multiplying said channel sequence by a numerical value depending on a said received symbol.

13. The method of claim 10 wherein said a second spread spectrum basis having a multiplier of $\mu$ is also stored, and wherein a third spread spectrum basis is generated by the Pollen product of said first and second spread spectrum bases.

14. The method of claim 10 wherein said numerical values comprising said first spread spectrum basis are dyadic rational numbers.

* * * * *

UNITED STATES PATENT AND TRADEMARK OFFICE
CERTIFICATE OF CORRECTION

PATENT NO. : 5,081,645

DATED : January 14, 1992

INVENTOR(S) : Resnikoff, et al.

It is certified that error appears in the above-identified patent and that said Letters Patent is hereby corrected as shown below:

Column 1, line 43, delete "than" and insert therefor --then--.

Column 1, line 52, delete "to" after "not".

Column 2, line 27, (Eq. 2), delete "(" and insert therefor --[--.

Column 2, line 44, delete "increase the correlation" and insert therefor --increase the correlation value--.

Column 2, line 58, delete "Bell Systems Tech. Journal" and insert therefor --*Bell Systems Tech. Journal*--.

Column 3, line 19, delete "noted the" and insert therefor --noted that--.

Column 4, line 5, after "increased" insert --,--.

Column 4, line 11, delete "wish" and insert therefor --wishes--.

Column 4, line 53, delete "L-1" and insert therefor --(L-1)--.

Column 5, line 33, delete "decoder 20" and insert therefor --decoder 30--.

Column 6, line 2, delete "L-1" and insert therefor --(L-1)--.

Column 6, line 51, delete "values" and insert therefor --value--.

Column 6, line 52, delete "provide" and insert therefor --provided--.

Column 7, line 39, delete "encoder 50" and insert therefor --encoder 40--.

Column 7, line 43, delete "encoder 50" and insert therefor --encoder 40--.

Column 7, line 47,48, delete "descrete such" and insert therefor --such discrete--.

UNITED STATES PATENT AND TRADEMARK OFFICE
CERTIFICATE OF CORRECTION

PATENT NO. : 5,081,645

DATED : January 14, 1992

INVENTOR(S) : Resnikoff, et al.

It is certified that error appears in the above-identified patent and that said Letters Patent is hereby corrected as shown below:

Column 7, line 56, delete "encoder 50" and insert therefor --encoder 40--.

Column 7, line 65, delete "(*)" and insert therefor --(*)--.

Column 8, line 8, delete "utilizing" and insert therefor --utilizes--.

Column 8, line 17, delete " -1," and insert therefore --( -1),--.

Column 8, line 32, delete "registers" and insert therefor --register--.

Column 8, line 40, delete "L-1" and insert therefor --(L-1)--.

Column 8, line 45, delete "of" after "value".

Column 8, line 48, delete "50" and insert therefor --40--.

Column 10, line 10, delete "throughout" and insert therefor --throughput--.

Column 10, line 37, delete "a" after "the".

Column 10, lines 50 & 51, delete "converts" and insert therefor --converters--.

Column 11, line 14, after "which" insert --is--.

Column 11, line 16, delete "is" and insert therefor --has--.

Column 11, line 33, delete "a" after "at".

Column 11, line 37, after "system" insert --,--.

Column 11, line 42, delete "signal at the decoder" and insert therefor --signal at the encoder--.

Figure 4:
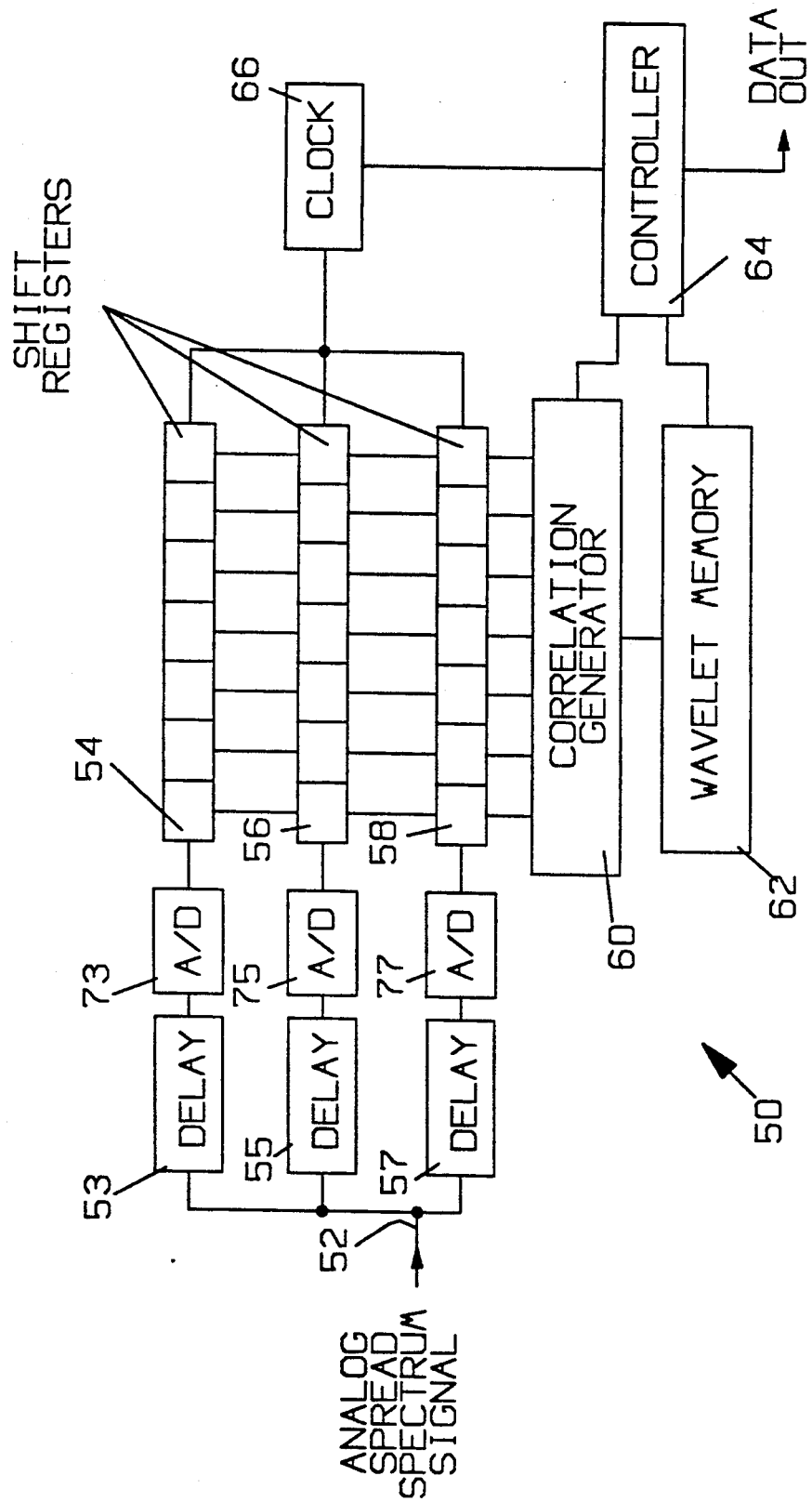
FIG. 4 is a block diagram of an exemplary spread spectrum signal decoder 50 having circuitry for detecting and correcting for drift in synchronization.

Column 12, lines 22 & 23 delete "Figure 3" and insert therefor --Figure 4--.

UNITED STATES PATENT AND TRADEMARK OFFICE
CERTIFICATE OF CORRECTION

PATENT NO. : 5,081,645

DATED : January 14, 1992

INVENTOR(S) : Resnikoff, et al.

It is certified that error appears in the above-identified patent and that said Letters Patent is hereby corrected as shown below:

Column 12, line 34,35,36, delete "delay 55 is slightly larger than delay 57, and delay 57 is slightly larger than delay 56." and insert therefor --delay 53 is slightly larger than delay 55, and delay 55 is slightly larger than delay 57.--.

Column 12, line 42, delete "decoder and" and insert therefor --encoder and--.

Column 12, line 44, delete "encoder" and insert therefor --decoder 50--.

Column 12, line 49,50, delete "encoder too late than shift register 52" and insert therefor --decoder 50 too late; in this case, shift register 58--.

Column 12, line 53, after "each" insert --of the--.

Column 13, line 1, delete "56" and insert therefor --58--.

Column 13, line 29, delete "wave form" and insert therefor --waveform--.

Column 13, line 36, delete "previous" and insert therefor --previously--.

Column 13, line 42, delete "encoder" and insert therefor --decoder--.

Column 13, line 44, delete "encoder" and insert therefor --decoder--.

Column 13, line 54, delete "either" after "determined".

Column 14, line 2, delete "later" and insert therefor --latter--.

Column 14, line 6, delete "convention" and insert therefor --conventional--.

Column 14, line 8, delete "Table I" and insert therefor --Figure 5--.

Column 14, line 63, delete "hoping" and insert therefor --hopping--.

UNITED STATES PATENT AND TRADEMARK OFFICE
CERTIFICATE OF CORRECTION

PATENT NO. : 5,081,645

DATED : January 14, 1992

INVENTOR(S) : Resnikoff, et al.

It is certified that error appears in the above-identified patent and that said Letters Patent is hereby corrected as shown below:

Column 16, line 12, delete "than" and insert therefor --then--.

Column 16, line 33, delete "," after "art".

Column 16, line 55, delete "carrier" and insert therefor --carried--.

Column 16, line 56, after "cycles" insert --.--.

Column 18, line 57, delete "for" after "delay means".

Column 2, line 23, after "starting" delete "at".

Column 2, line 57, delete "theory" and insert therefor --Theory--.

Column 2, line 57, delete "secrecy" and insert therefor --Secrecy--.

Column 2, line 58, delete "systems" and insert therefor --Systems--.

Column 5, line 40, after "invention" delete ",".

Column 9, line 6, delete "in" and insert therefore --is--.

Column 9, line 18, delete "symbols" and insert therefor --symbol--.

Column 9, line 41, delete "than" and insert therefor --then--.

Column 11, line 40, delete "is" and insert therefor --are--.

UNITED STATES PATENT AND TRADEMARK OFFICE
CERTIFICATE OF CORRECTION

PATENT NO. : 5,081,645

DATED : January 14, 1992

INVENTOR(S) : Resnikoff, et al.

It is certified that error appears in the above-identified patent and that said Letters Patent is hereby corrected as shown below:

Column 11, line 48, delete "later" and insert therefor --latter--.

Column 11, line 53, delete "need" and insert therefor --needed--.

Column 12, line 62, delete "identify" and insert therefor --identity--.

Column 20, line 16, after "said" delete "the".

Column 20, line 21, after "wherein" delete "said".

Signed and Sealed this

Twenty-third Day of November, 1993

*Attest:*

BRUCE LEHMAN

*Attesting Officer*         *Commissioner of Patents and Trademarks*